United States Patent [19]

Alexander et al.

[11] Patent Number: 5,305,533
[45] Date of Patent: * Apr. 26, 1994

[54] COMBINED DIRECT AND INDIRECT ROTARY DRYER WITH RECLAIMER

[76] Inventors: Donald J. Alexander, 125 Webster St.; Robert A. Sindelar, 606 E. South St., both of Beaver Dam, Wis. 53916

[*] Notice: The portion of the term of this patent subsequent to Jan. 28, 2009 has been disclaimed.

[21] Appl. No.: 9,856

[22] Filed: Jan. 27, 1993

[51] Int. Cl.⁵ .............................................. F26B 19/00
[52] U.S. Cl. ......................................... 34/48; 34/108; 34/137; 432/107
[58] Field of Search ................. 34/136, 137, 108, 48, 34/54; 366/25; 432/105, 107, 111, 112

[56] References Cited

U.S. PATENT DOCUMENTS

| | | |
|---|---|---|
| 1,007,689 | 11/1911 | Guelich . |
| 1,072,186 | 9/1913 | Smith . |
| 1,587,761 | 11/1925 | Cummer . |
| 1,717,704 | 6/1929 | Greene . |
| 1,867,739 | 7/1929 | Frazee . |
| 2,967,696 | 1/1961 | Mauldin et al. ................. 259/158 |
| 3,294,383 | 12/1966 | Traux ................................ 263/33 |
| 3,407,511 | 10/1968 | Camm ............................... 34/109 |
| 3,974,724 | 7/1975 | McConnaughay .............. 259/158 |
| 4,277,180 | 7/1981 | Munderich ........................ 366/7 |
| 4,393,603 | 7/1983 | Casperson ........................ 34/39 |
| 4,400,153 | 8/1983 | Miskell .............................. 432/103 |
| 4,940,334 | 7/1990 | Musil ................................. 366/4 |
| 4,964,226 | 10/1990 | Gobel ................................ 34/136 |
| 5,083,870 | 1/1992 | Sinelar et al. ................... 366/25 |

FOREIGN PATENT DOCUMENTS 964620  4/1948  France .................. 34/136

Primary Examiner—Henry A. Bennet
Attorney, Agent, or Firm—Lathrop & Clark

[57] ABSTRACT

Both indirect and counterflow direct heating are utilized in a dryer to achieve improved efficiency with a reduced tendency to char or damage the treated material. A horizontal drum has a first segment of aluminum and a second section of stainless steel and is disposed within a heating chamber which is divided into two sections by a baffle. Hot combustion gases are introduced to the chamber and flow to the end of the heating chamber to the rear of the drum and enter the drum. The gases counterflow through the drum in a direction opposite to material moving through the drum to exchange heat. The gases remove moisture from the material and exit the drum into a preheat zone of the chamber where the moisture laden gases condense on the drum's surfaces. The exhaust gases then proceed up two stacks. The interior surfaces of the heating chamber and the preheat chamber are insulated to increase thermal efficiency.

18 Claims, 9 Drawing Sheets

COMBINED DIRECT AND INDIRECT ROTARY DRYER WITH RECLAIMER

FIELD OF THE INVENTION

The present invention relates to dryers and heaters generally and to rotary drum dryers used to heat and dry sludge or granular material in particular.

BACKGROUND OF THE INVENTION

Rotary dryers and heat exchangers are used to transfer heat from a hot gas, usually the product of combustion, to the sludge or granular material which it is desired to heat or dry. Rotary drum dryers are generally of two types. Both types employ a horizontal rotating drum through which the sludge or granulated material passes. The drum is generally slightly inclined from the infeed end to the outfeed end to cause the material being dried to progress down the drum as it rotates. Often mounted within the drum are lift flights of various types designed to agitate the material passing through the drum and/or to cast the material into a falling veil of material where it can interact with gases passing through the drum. One type of drum heater utilizes indirect heating wherein a furnace or manifold for hot gases surrounds the central portion of the drum, thus heating the exterior of the drum which in turn heats the material passing through the interior of the drum by conduction and radiation.

The other type of drum dryer employs direct heating wherein a burner or furnace at one end of the drum introduces hot combustion gases into the interior of the drum. The hot combustion gases directly transfer heat to and dry moisture from the sludge or granular material progressing through the drum. The directly fired drum heaters are divided into those in which the combustion gases flow in the same direction as the granular material through the drum, and those in which the combustion gases counterflow the granular material being dried or heated. The counterflow type dryers have the advantage of greater thermal efficiency. Counterflow dryers, because they bring the driest, warmest material directly into contact with the hot drying gases entering the dryer, have a tendency to overheat at least a portion of the material being dried. Parallel flow dryers, on the other hand, are less efficient but, because the hot drying gases first meet the cool, damp granular material being dried, are less subject to overheating the material.

Some materials such as rock aggregate are not adversely affected if a portion of the material is heated significantly above the average desired temperature of the particulate being heated. On the other hand, in the treatment of other materials which may be desirable to heat or dry in a rotating drum dryer such as recycled asphalt, wood chips, agricultural products and pulp mill sludge, overheating even a small portion of the material can result in charring which may adversely affect the product being heated and will often release large quantities of particulate matter and volatiles in the form of smoke. Where air quality is a concern, the cost of removing the particulate and particularly the volatile will often indicate the use of the less efficient parallel flow rotary drum dryer, which to a lesser extent is still prone to generating smoke from materials with low char temperatures.

Indirect rotary drum heaters can be used to supply a more uniform heating to the contents of a drum dryer, and may also be used where it is desirable not to contact the material being processed with combustion gases so as to avoid contamination of the processed material. Indirect rotary drum dryers, however, are limited in efficiency. It is more difficult to make the gases in the oven flow in counterflow to the material inside the drum, as the gases in the oven or manifold surrounding the rotating drum have a tendency to rise to the top and generally to be churned by the moving drum surface, thus preventing the heating gases from moving in uniform counterflow to the material inside the drum. Further, because the heating takes place through the drum, a significant temperature differential must be maintained between the external gases and the material moving through the drum to cause significant amounts of heat to flow from the gases into the materials, thus the exhaust gases of an indirectly heated drum necessarily carry with them considerable wasted energy.

One known type of drum dryer employed in drying pellets of carbon black utilizes an indirectly heated drum dryer with a jacket surrounding the center of the drum to which a heating medium such as combustion gases are supplied. This known drum heater also employs a small stream of hot gases moving in counterflow through the drum for the purposes of purging liquid vapor from the drum. Other known rotary drum dryers employ both indirect heating by means of a jacket or oven surrounding the drum and direct firing by means of a burner at one end of the drum. Still other known types of rotary drum dryers employ indirect heating by means of an oven surrounding the drum and by means of perforations in the drum which allow the entry of combustion gases from the oven into the drum along its length.

Dryers by their nature evaporate large quantities of water, an energy intensive process which absorbs approximately 1,000 btu's per pound of water evaporated. In many situations employing a rotary drum for heating or drying, the majority of the energy utilized goes into the evaporation of water. Known rotary drum dryers do not have any means for recovering any portion of the latent heat contained in the driven-off water vapors.

Further, known rotary drum dryers and heaters often require expensive pollution control equipment such as baghouses to control the emission of dust and smoke from the dryer.

What is needed is a rotary drum heater/dryer with large capability, high efficiency, uniform heating and minimized emissions.

SUMMARY OF THE INVENTION

The dryer of the present invention utilizes both indirect and counterflow direct heating to achieve improved efficiency with a reduced tendency to char or damage the treated material. The rotary drum dryer of this invention is related to and incorporates certain features of our earlier patent, U.S. Pat. No. 5,083,870, granted Jan. 28, 1992, for an *ASPHALT PLANT WITH SEGMENTED DRUM AND ZONAL HEATING* which is incorporated herein by reference.

The dryer of this invention has a horizontal drum. The drum is constructed of a first segment approximately one-third the length of the drum, which is constructed of aluminum for high thermal conductivity and which is joined to a second section making up the latter two-thirds of the drum by a bolted joint formed by an overlying stainless steel sleeve which is in turn welded to the second section of the drum which is also constructed of stainless steel.

The drum is disposed within a chamber, which is divided into two sections by a baffle which the drum penetrates. The forward or preheat section of the heating chamber contains the aluminum portion of the drum. This section of the heating chamber preheats the material which is fed into the drum for heating and recovers latent heat from the water vapor in the heating chamber exhaust. The second section of the heating chamber is the burner section which has a multiplicity of burners mounted on the chamber side to direct their flame into and beneath the drum.

The drum is supported by iron tires which are located at approximately 20 and 80 percent of the length of the drum. The tires rest on pairs of trunions which are mounted to a support frame. The trunions are driven by hydraulic motors through a speed reduction gear. The support frame may have wheels so the dryer may be readily moved from place to place.

The drum is caused to rotate by the driven trunions which are isolated from the preheat and burner sections of the heating chamber.

The heating chamber has a material infeed end located within the forward preheat section. Granular material or sludge is fed by a tube which penetrates the infeed end wall of the chamber and empties into the infeed end of the drum. The tube communicates with a hopper and disposed within the hopper is a seal vane which allows material to enter the heating chamber and the drum without allowing gases to escape. Sweeps within the drum move the material from the front of the drum towards the back of the drum. Eleven sets of quadrant plates which are each offset from the previous set by 30 degrees about the axis of the drum divide the central portion of the drum into quadrants. Flights within the rotating drum lift and mix the sludge or granular material. The rear end of the drum has a region with lifting flights which lift and drop the material and has an area where water, asphalt, or other material may be added and mixed with the sludge or granular material. The dried and heated material leaves the end of the drum and falls into an outfeed trough with wiper blades affixed to the drum which wipe the unloaded material to the unloading chute. The unloading chute is sealed from the atmosphere by a double-hinged door.

The exterior of the aluminum section of the drum is covered by fins aligned in rows which are alternately angled in opposite directions. These fins function to agitate and stir the gases in the preheat section of the heating chamber. In the burner section of the heating chamber the fins are all aligned with the same offset so as to move gases towards the back of the chamber near the material outfeed end of the drum.

Hot combustion gases from the burners are induced by the fins to flow to the end of the heating chamber through two horizontal chimneys which conduit the heating gases past the rear tire and drive trunions which are located in the open to keep the drive trunions, and their bearings, speed reducers and hydraulic motors cool. From the horizontal chimney, the gases flow to the rear of the drum and enter the drum. The gases counterflow through the drum in a direction opposite to the granular material moving through the drum so exchanging heat with the granular material.

The exhaust gases remove moisture from the sludge or granular material and exit the material loading end of the drum into the preheat or condensing zone of the chamber where the moisture laden gases condense on the drum's surfaces and fins, thus heating the drum and washing out entrained particles. The condensation and entrained particles are removed from the preheat section of the drum by a flushing system. The exhaust gases then proceed up to the top of the preheat section were they remain until the gasses are sufficiently cool to settle to the bottom of the preheat section were they can enter the stacks which have openings just above the bottom of the preheat section and are located adjacent to the baffle separating the preheat chamber from the heating chamber.

Jack support platforms are located under the forward and rear trunions which support the heating drum. In operation the dryer is jacked into a position with a ¾ to 1 inch per foot slope from the infeed end to the outfeed end. The interior surfaces of the heating chamber and the preheat chamber are insulated to increase thermal efficiency.

It is an object of the present invention to provide a dryer which is of high thermal efficiency.

It is a further object of the present invention to provide a dryer which can rapidly heat large amounts of sludge or granular material without heating any of the material above the desired end temperature.

It is also an object of the present invention to provide a heat exchanger which can be utilized to rapidly and efficiently melt snow and ice.

It is yet another object of the present invention to provide a heater which can sterilize large quantities of medical waste efficiently and without overheating the same.

It is an additional object of the present invention to provide a heater which can process large quantities of agricultural materials such as corn, wood chips and the like.

It is a further object of the present invention to provide a dryer which can dry sludge such as pulp sludge to produce feed for a waste burner.

It is yet an additional object of the present invention to provide a dryer employing condensing water vapor to remove particulate from the exhaust gases.

It is a yet further object of the present invention to provide a heater to sterilize or pasteurize soil.

Further objects, features, and advantages of the invention will be apparent from the following detailed description when taken in conjunction with the accompanying drawings.

DESCRIPTION OF THE PREFERRED EMBODIMENT

Figure 5:
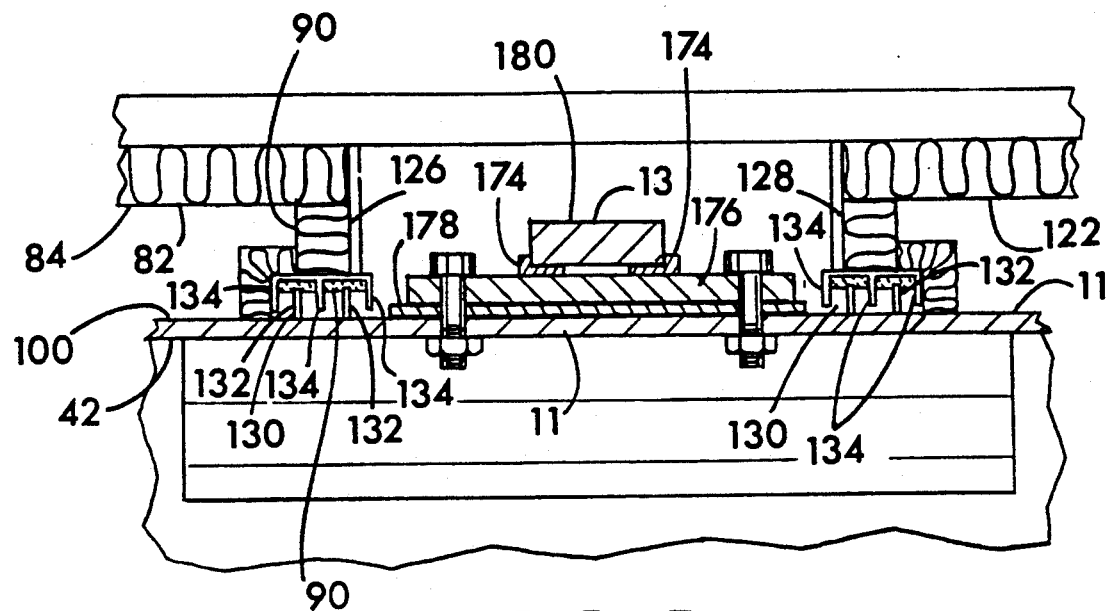
FIG. 5 is an enlarged detail cross-sectional view of the drum dryer of FIG. 1D taken along section line 5—5.
Figure 6:
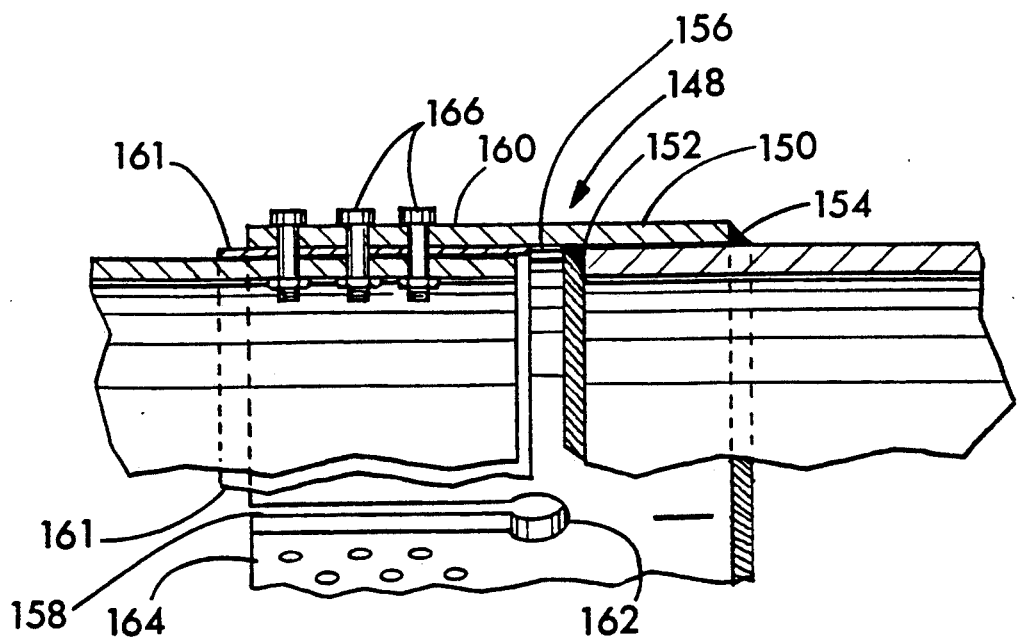
FIG. 6 is a side elevational view of the drum dryer of FIG. 1B taken along section line 6—6.
Figure 7:
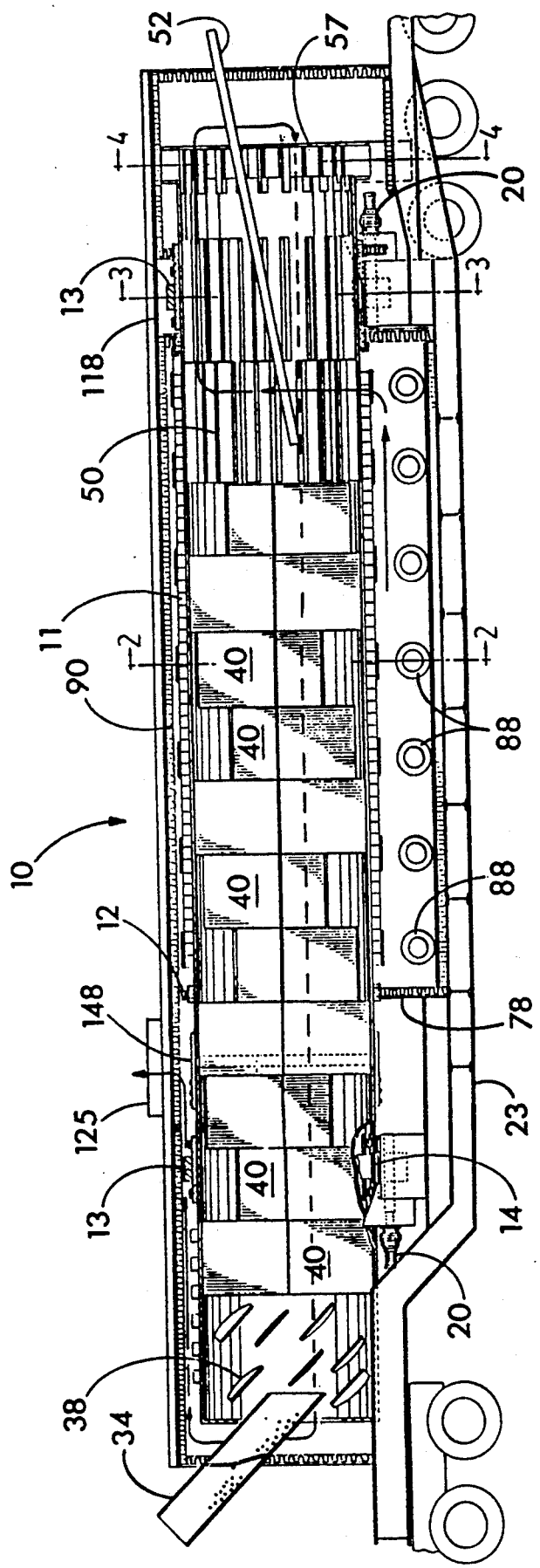
FIG. 7 is a side elevational view, partly cut away, of the drum dryer apparatus of this invention combining the FIGS. 1A, 1B, 1C, and 1D.

Referring more particularly to FIGS. 1A-7 wherein like numbers refer to similar parts a rotary drum dryer apparatus 10 is shown in segments in FIGS. 1A, 1B, 1C, and 1D and entire in FIG. 7. As best shown in FIGS. 1A-1D, the drum dryer apparatus 10 has a cylindrical drum 11 which is rotatably mounted within a heating chamber 12. The drum 11 has an exterior 24 which surrounds a cavity 25 through which material travels in counterflow relation with heated exhaust gases. Burners 88 are mounted within the heating chamber which heat the contents of the drum cavity 25 indirectly by directing heat to the drum exterior and directly by ducting heated exhaust gases through the cavity itself.

Figure 1A:
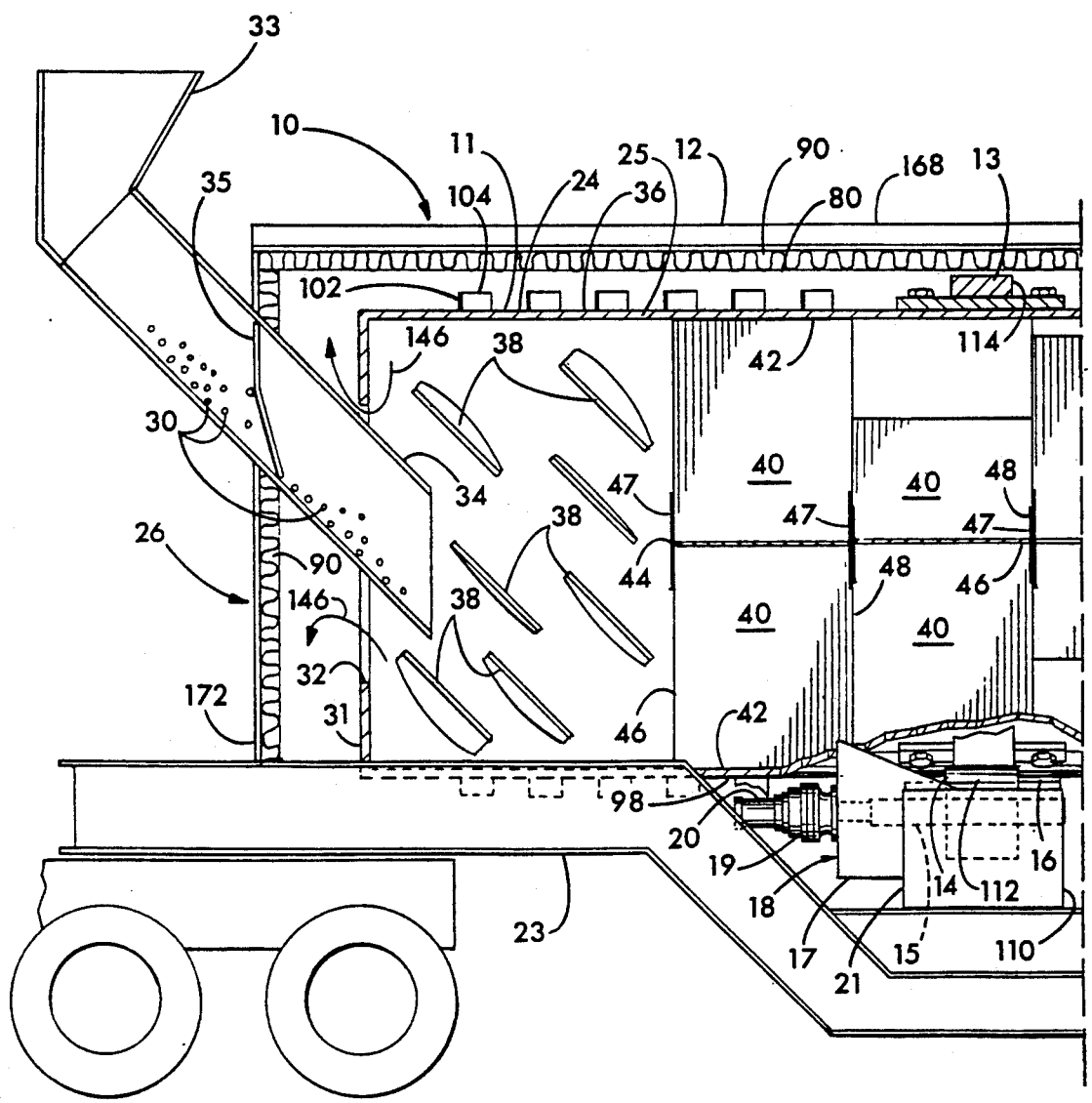
FIG. 1A is a side elevational view partly cut away of the forward section of the rotary drum dryer apparatus of this invention.
Figure 1B:
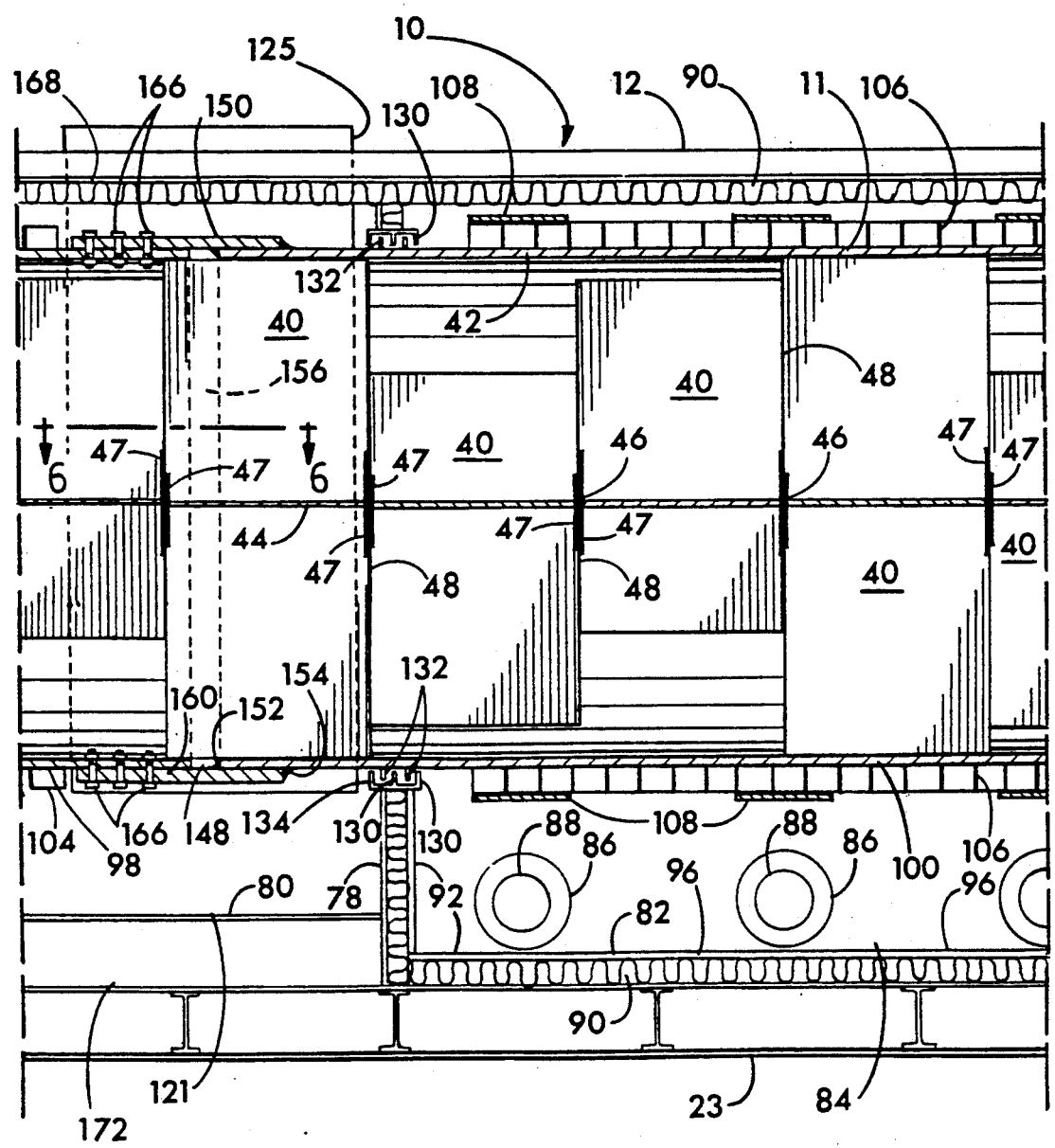
FIG. 1B is a side elevational view, partly cut away, of the forward middle section of the apparatus of FIG. 1A.
Figure 1C:
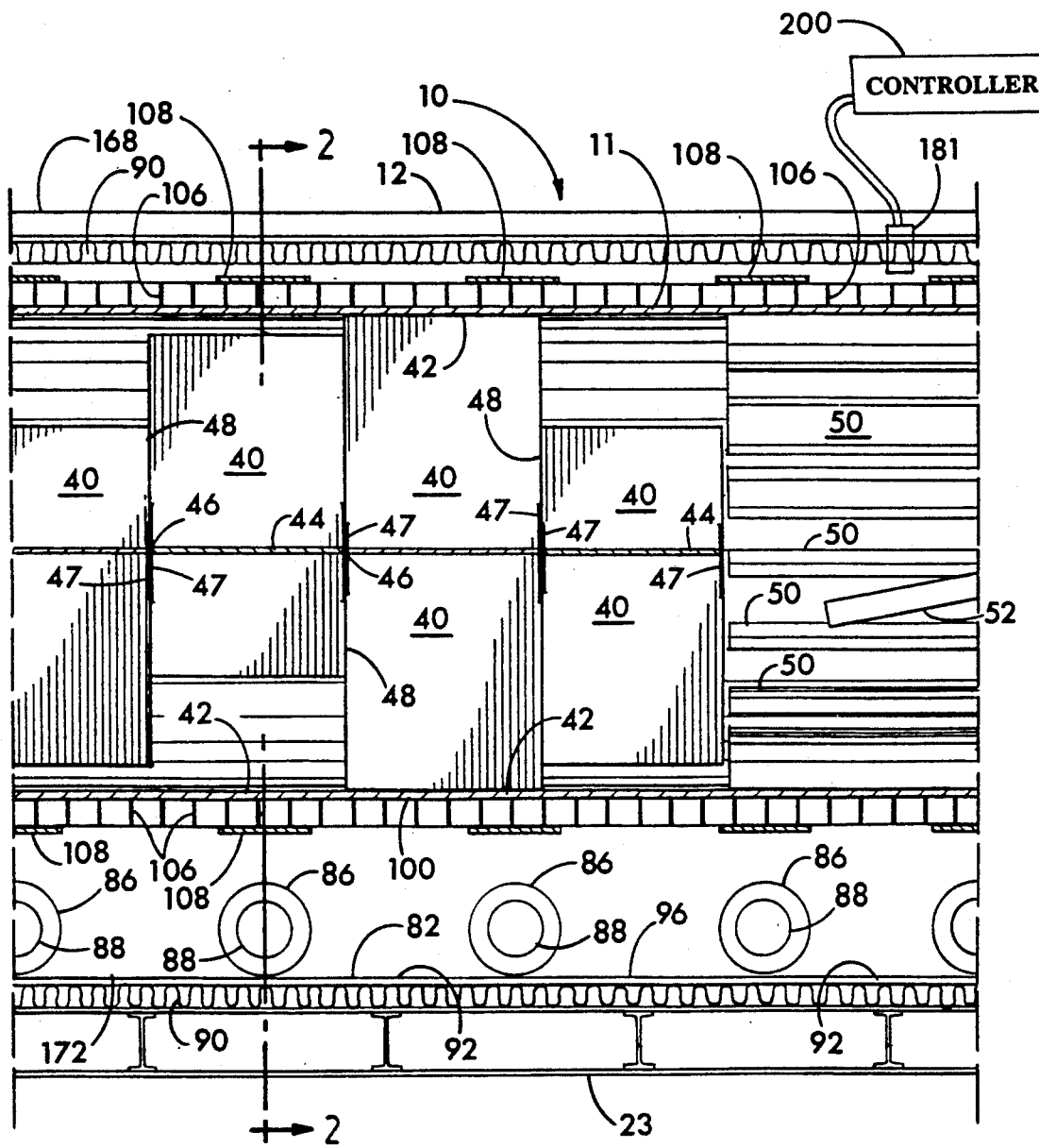
FIG. 1C is a side elevational view, partly cut away, of the rear middle portion of the apparatus of FIG. 1A.
Figure 1D:
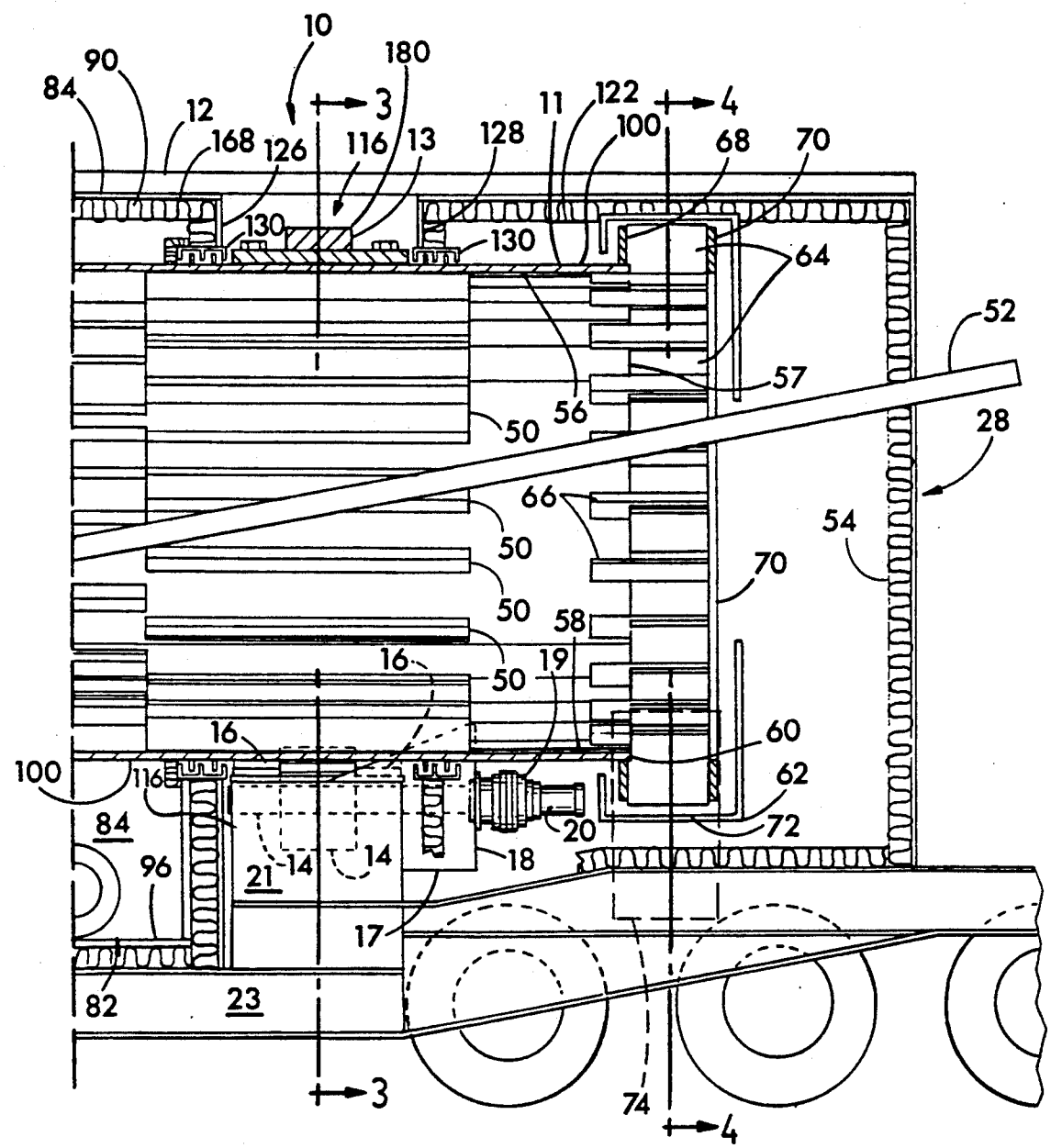
FIG. 1D is a side elevational view, partly cut away, of the rear portion of the rotary drum dryer apparatus of FIG. 1A.

Two circumferential annular steel tires 13, shown in FIGS. 1A, 1D, extend from the drum 11 and ride on trunions 14. The trunions rotate on trunion axles 15 best shown in FIG. 3. The trunion axles in turn ride in trunion bearings 16 which are mounted to a trunion drive plate 17. The trunion drive plate has a speed changer bracket 18 on which is mounted a speed reduction gear 19. A hydraulic drive motor 20 is mounted to the speed reduction gear 19 to drive the trunions and rotate the drum.

Figure 3:
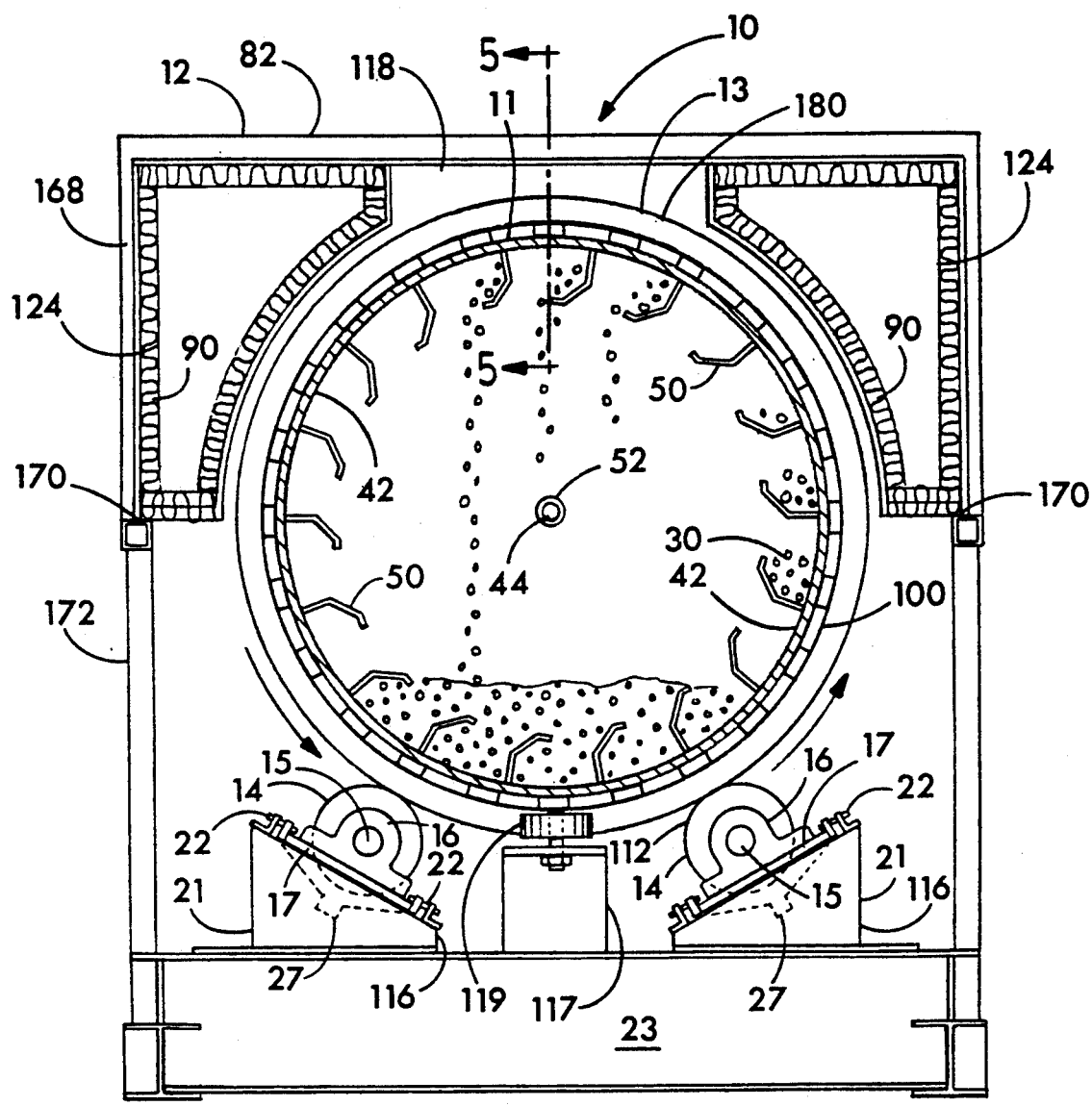
FIG. 3 is a cross-sectional view of the drum dryer apparatus of FIG. 1D taken along section line 3—3.
Figure 4:
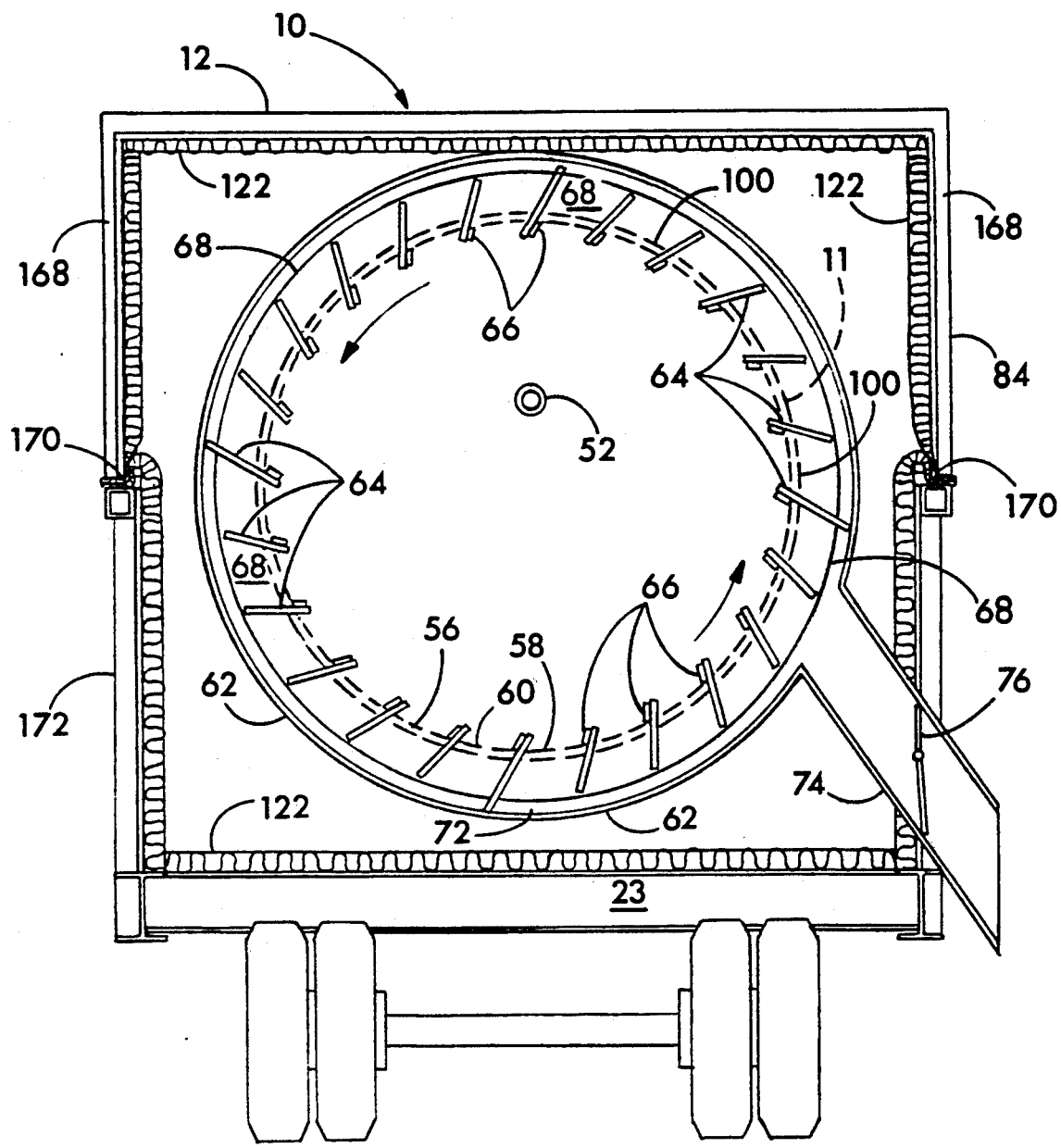
FIG. 4 is a cross-sectional view of the drum dryer apparatus of FIG. 1D taken along section line 4—4.

As shown in FIG. 3 the trunion drive plate 17 is adjustably mounted to a trunion support wedge 21 by adjustment screws 22 which allow the trunions 14 to be aligned in proper driving relation with the tires 13. The adjustment screws 22 allow the rotation of the trunion drive plate 17 about the trunion pin 27. By such a rotation the trunion axles 15 can be angled slightly to the axis 44 of the drum 11 to drive the drum 11 toward the infeed end 26.

The trunion support wedges 21 are mounted to a frame 23. Jack supports (not shown) are located directly under the trunion wedges 21 and frame 23 and serve to support the drum dryer apparatus when in operation. In operation the front 26 of the dryer 10 is elevated above the dryer back 28 by jacks (not shown) which support the dryer 10 with a front to back slope of approximately ¾ to 1 inch per foot such that sludge or granular material 30 will progress through the drum from the material inlet 32 to the material outlet 57.

The drum front 31 constitutes the material infeed end and has a circular inlet opening 32 through which sludge or granular material 30 may enter the drum 11. The material 30 is supplied to the drum inlet 32 by a hopper 33 which discharges material to a feed tube 34 which penetrates and extends through the end wall 26 of the heating chamber 12.

A double hinged sealing vane or rubber flap 35 in the feed tube prevents the escape of gases from the heating chamber 12 through the feed tube 34. Material will conventionally be supplied to the feed tube 34 by a conveyor, screw auger or the like (not shown). In this manner a steady stream of material 30 is supplied for processing by the rotary drum dryer apparatus 10.

A series of rigid plates are affixed to the interior of the drum front section 36 and extend radially inwardly. There are two rows of twelve plates or sweeps 38 which move the granular material 30 onto a series of sets 46 of short quadrant plates 40. Each set consists of four quadrant plates 40 which are welded or bolted to the interior surface 42 of the drum 11, joined along the drum axis 44, and angled from each other 90 degrees. The quadrant plates 40 are approximately 3 feet long and each successive set 46 is offset from the previous set by 30 degrees about the axis 44 of the drum 11.

The quadrant plates 40 allow the drum to support a larger flow of material 30 by essentially dividing the drum 11 into four smaller drums. Because each successive set 46 of quadrant plates 40 is offset by 30 degrees, the granular material may pass from one quadrant to another at the juncture 48 of the two adjacent quadrant plate sets. As the drum 11 rotates, the material 30 which is supported on the quadrant plates 40 slides down the quadrant plates towards the axis 44 or towards the drum interior surface 42 when the drum 11 reaches a critical angle with respect to a particular quadrant plate 40.

Figure 2:
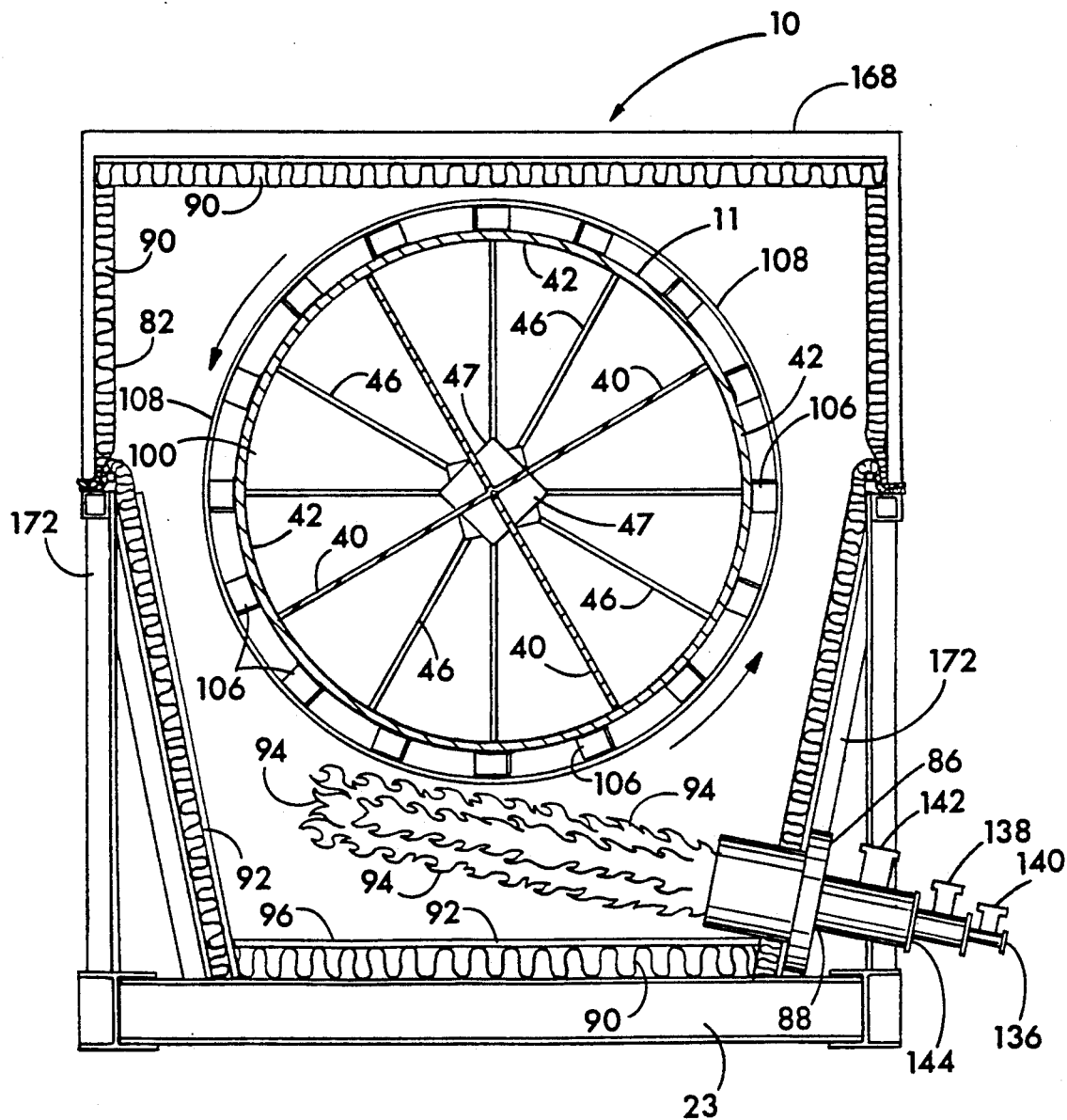
FIG. 2 is a cross-sectional of the rotary dryer of FIG. 1A-1D.

As shown in FIG. 2, square diamond plates 47 are affixed within the drum and extend perpendicularly to the drum axis. The plates 47 are mounted between sets of quadrant plates 46 to retain the material when it slides toward the axis 44 of the drum 11 and form pockets with the quadrant plates 40 where they meet the axis 44.

If a single set of quadrant plates is used throughout the length of the drum, the torque necessary to rotate the drum will not be continuous as the drum is rotated. Further, on stopping the drum 11, material sliding on the quadrant plates can cause the drum to continue to rotate for some angle before stopping. By dividing the length of the drum up into a plurality of successive quadrant plate sets 46 the fall of material from the drum interior surface 42 to the drum axis 44 is broken up into discrete motions which smooth out the overall motion of the drum and allow the drum 11 to be more precisely stopped and started. The use of divided quadrant plates 46 also reduces the power required to drive the drum 11. At the rear end of the drum, depending on the application, it may be desirable to have one or more offset sets of flights 50. As shown in FIGS. 1C and 1D, two sets of eighteen flights 50 offset from each other form a mixing zone where material may be added to the granular material being dried.

As best shown in FIGS. 1C, 1D, and 7 a pipe 52 penetrates the rear wall 54 of the heating chamber 12 and allows the introduction of material into the dryer 10 from the outlet end. In many instances, it will be desirable to add some component through the pipe 52 to the material being dried. For instance, if the material being heated and dried is aggregate or recycled asphalt, it may be desirous to add asphaltic materials to produce a complete asphaltic composition. Other examples would include the rehydration of medical wastes after they have been sterilized to reduce the production of dust. A further example would be the addition of a base such as $Ca(OH)_2$ to a waste product containing heavy metals to prevent the leaching of the same when the material is disposed of in a landfill. A further example would be the addition of mineral salts to soy beans which are being cooked for animal feed purposes. Yet another example would be the addition of soil emollients and fertilizer to soil being sterilized in the dryer 10.

The rearmost section 56 of the drum is without flights to allow the material 30 to collect on the bottom 58 of the drum 11. The material 30 leaves the drum 11 through a material outlet opening 57 and falls over the rear lip 60 of the drum 11 into a discharge trough 62, best shown in FIG. 4. Twenty-four discharge sweeps 64 are mounted to the drum by support brackets 66 and are supported by rings 68, 70. Every fourth discharge sweep 64 is of slightly greater radial extent and sweeps closer to the bottom 72 of the discharge trough 62. The sweeps 64 do not rub on the bottom 72 of the discharge trough, rather they stand off from the bottom 72 about three inches to prevent wear by allowing the buildup of material 30 on the discharge trough bottom 72. The sweeps 64 of greater radial extent prevent the material from becoming hard packed against the sweeps 64. The discharge sweeps 64 move the material 30 to a discharge chute 74 which discharges the material through a double hinged sealing door 76 to the exterior of the dryer 10 for further processing, storage, or immediate use.

The drum 11 is situated within the heating chamber 12 as shown in FIGS. 1A–1D. The heating chamber is divided into two parts by a baffle 78 which divides the front one-third 80 from the rear two-thirds 84. The front one-third or preheat and heat recovery section 80 is separated by the baffle 78 from the rear two-thirds or burner section 84. Within the burner section 84 are seven burner ports 86 shown in FIG. 2 and FIGS. 1B and 1C. Not all the burner ports 86 need be filled. For instance starting with the burner port nearest the central baffle 78 ports 1, 2, 3, 5 and 7 may be filled, for example. The burners 88 are of the industrial type supplying approximately 9,000,000 btu's per hour per burner which may burn either heating oil or natural gas.

The interior of the burner section 84 is insulated with ceramic fiber battens 90 which are overlain by insulating board 92 where the flame front 94 impacts the interior walls 96 of the burner section 84.

The drum 11 is composed of two sections: a forward one-third section 98 constructed of aluminum and a rear two-thirds section 100 which is constructed of stainless steel. Both sections 98, 100 have outwardly protruding fins 102. The forward section fins 104 are aligned in rows which alternately are angled up and down from a line tangent to the surface of the drum. The fins 106 on the rear section 100 of the drum are stainless steel and are all angled in the same direction so as to move gases towards the rear of the burner section 84. Where the rear fins 106 are above the flame front 94 produced by the active burners 88 they are covered by a band 108 of stainless steel which prevents the burners from overheating the drum 11 or the material 30 lying directly over the burners 108.

Because the trunions 14 and their bearings 16, the speed reduction gears 19, and the hydraulic motors 20 are susceptible to heat, the trunions are not within the confines of the heating chamber 12. Because the temperatures in the front preheating section 80 of the heating chamber 12 are relatively low the forward trunion assembly 110 is separated from the interior of the preheat chamber 80 by a rubber gasket (not shown) which surrounds the trunion surface 112 where it is in driving relationship with the forward tire 114. The rear trunion assembly 116, because it is located in the hot burner section 84, has been completely taken out of the heating chamber by a rear trunion gap 118 which divides the burner section 84 into a forward burner section 82 and the ducting section 122. The two sections are in communication by means of horizontal chimneys 124 best shown in FIG. 3. The horizontal chimneys 124 are horizontally extending ducts which are located within the heating chamber above the drum. The chimneys 124 conduct the burner heated exhaust gases from the forward burner section 82 through the ducting section 122 to the rear of the drum where they enter the drum outlet 57 in counterflow to the material 30.

Located between the rear trunion assembles 116 is an idler or thrust bearing 119 mounted on a bracket 117. The thrust bearing 119 prevents movement of the drum 11 along the axis 44 of the drum 11.

The rear tire 180, as shown in FIG. 5 is mounted on tire wedges 174 which are mounted on tire suspension bars 176 which are in turn bolted to the drum 11 through shims 128 by bolts 182.

The rear trunion gap 118 is formed by a forward trunion baffle 126 and a rear trunion baffle 128. The central baffle 78 and the trunion baffles 126, 128 require a moving gas seal between the drum and the baffles if the flow of gases within the dryer 10 is to be optimal.

The moving seals are formed by labyrinth seals which are shown in detail in FIG. 5. The labyrinth seals consist of two radial baffles 132 mounted to the drum and three radial baffles 134 mounted to the heating chamber 12. The radial baffles 132 on the drum interdigitate with the radial baffles mounted to the chamber 134 to form a labyrinth. Because the opposed radial baffles do not touch, there is no sliding friction between the drum and the heating chambers at the labyrinth baffles. However, the labyrinth baffles do provide a barrier to the flow of gases, the long winding path results in significant pressure drop across the labyrinth seal 130 resulting in minimal gas leak across the seals. To improve the labyrinth seal 130 it may be packed with ceramic board 92 and the radial baffles 132 allowed to cut close fitting groves therein as shown in FIG. 5.

The burners 88 are standard industrial burners which can be fired with both heating oil and natural gas. The industrial burners 88 come in a number of standard sizes which may be varied depending on the application of the dryer 10. Exemplary heaters would produce 9,000,000 btu's per hour. Hence, with 5 burners installed a total heating capability of 45,000,000 btu's per hour would be provided. This would be adequate to melt approximately 80 tons of snow and ice an hour or to produce approximately 200 tons per hour of asphaltic material for paving purposes. The burners are supplied with an oil injection port 136 and a gas and natural gas injection port 138. The burners also have ports for primary air 140 and secondary air 142. The primary air supply 140 mixes with the fuel oil or natural gas to support combustion while the secondary air assures complete combustion by supplying an excess of air.

To improve mobility the burners are provided with a quick disconnect 144 which removes the oil, gas and primary air injection ports 136, 138, 140 to reduce the overall width of the dryer 10 so it may be more readily transported over the roads.

As shown in FIG. 2, the burners 88 project a flame front 94 into the burner section 84 which passes under the drum 11 heating the drum 11 directly by convection and radiation. The flame front 94 also heats the ceramic insulating board 92 which reradiates to the drum. The heat passes through the drum into the interior surface 42 where it is transferred to the material 30 which is cascaded and slid along the drum surface 42, thus heating the material 30 by conduction and radiation.

Because the drum is caused to rotate at between 6 and 13 rpms, new granular material is constantly brought into contact with the drum surface and none of it is overheated. The preferred range of drum rotation is generally in the range of 8 to 9 rpm but the use of hydraulic motors 20 allows a greater range of 6–13 rpms.

Primary and secondary air are supplied by primary and secondary air manifolds (not shown) supplied by secondary and primary blowers (not shown) which are mounted to the frame 23 for transport with the dryer 10. The combustion of the primary and secondary air with the fuel results in combustion gases which fill and pressurize the burner section 84 of the heating chamber 12. Because the heating chamber 12 is sealed to the outside, the only escape for gases is through vertical vent chimneys 125 which are located in the heat reclaiming front section 80 of the heating chamber near the central baffle 78.

The combustion gases are thus forced to flow by pressure, draft, and by the rear fins 106 through the horizontal chimneys 124 which connect the forward burner section 82 with the duct section 122. The duct section 122 directs the gases into the rear of the drum where they counterflow the material 30. The combustion gases flow through the dryer which slopes upward from the material discharge end 56 to the material infeed end 31. Exiting the material inlet 32 the gases, shown by arrows 146, are mixed and circulate around the front 89 of the drum with the hottest gasses near the top of the preheat section 80.

Two functions are performed by the gases in the forward preheat section 80. First, water vapors condense on the aluminum surface of the drum giving up latent heat to the drum and preheating the incoming granular material 30. Secondly, the water vapor condensing in the preheat section tends to condense about dust particles thus precipitating and washing particulate matter from the exhaust stream. Fines and water collect in the bottom of the preheat section 80 in the fines tray 121, where a drain (not shown) and washout system (not shown) remove them.

The condensation of water vapor in the preheat section may completely eliminate the need for further processing of the exhaust gases before venting to the atmosphere. If further processing of the exhaust gases is required, a conventional baghouse may be used or the flat stack scrubber disclosed in our earlier application, U.S. Pat. No. 5,083,870. Where medical wastes are being sterilized, it may be desirable to inject a sterilizing agent into the preheat section such as ozone, chlorine or hydrogen peroxide.

Because the forward third 98 of the drum is constructed of aluminum and the rear two-thirds 100 of the drum is constructed of stainless steel a material which has a lower coefficient of thermal expansion than aluminum, a joint 148 which takes into account the dissimilar thermal expansion properties of the two metals must be employed. As shown in FIG. 6, the joint is formed by a stainless steel sleeve 150 which overlies approximately one foot of the stainless steel drum 100 and which is connected to the stainless steel drum by innerwelds 152 which underlie the sleeve and outerwelds 154 which overlie the drum 82.

The sleeve 150 receives the aluminum drum 98 with a 6 inch gap 156 between the ends of the aluminum drum 98 and the stainless steel drum 82. The sleeve 150 overlies the aluminum drum 98 by two feet. The overlapping section between the sleeve 150 and the aluminum drum 98 has six axially extending slots 158 which divide the overlapping portion 160 of the sleeve 150. The bottoms of the slots 158 have stress-relieving holes 162. Six petals 164 are defined between the slots 158. The petals 164 overlie the aluminum drum 98 and are bolted to the aluminum drum 98 by stainless steel bolts 166 which pass through the petals 164 and the aluminum drum 98 forming a joint 148 which can accommodate a dissimilar metal used in the rear drum section 100 and the forward drum section 98. The petals 164 may thus bend radially outwardly as the diameter of the cylindrical drums changes with temperatures. A stainless steel shim 161 may be added between all bolted joints where the two materials being joined have dissimilar galvanic potentials.

The upper portion 168 of the heating chamber 12 may be removed for inspection and repair of the drum 11. The upper portion 168 of the heating chamber 168 forms a joint 170 with the lower portion 172 of the heating chamber. The joint 170 of the heating chamber 12 crushes the ceramic insulating batten blanket 90 to form a seal between the upper 168 and lower 172 portions of the heating chamber 12. The upper portion 168 of the heating chamber 12 is held in place by latches (not shown) or load tie-down devices such as employed for retaining truckloads.

The dryer 10 has three access doors (not shown), one located in each of the preheat chamber 80, the burner section 84, and the ducting section 122 to allow ready access to the interior of the dryer 10. The doors not only allow access but function as blast doors for the relief of pressure should a fire or explosion take place within the heating chamber 12.

The dryer 10 may be utilized in the melting of snow and ice. In metropolitan areas and northern climes where snowfall is excessive, municipalities have been forced to truck snow and accumulated ice from downtown streets and parking lots to dump sites outside the city center. The cost of trucking in terms of fuel costs, wear and tear on equipment, and drivers' salaries are a less than desirable option. Further, the dumping of snow gathered from the city center can contain salts and other contaminants which could lead to water contamination problems depending on where the material is finally dumped.

Thus, the economic tradeoffs, especially to a municipality which may have access to natural gas at pipeline rates may allow a municipality to economically dispose of the excess snow through the city's sewer system if a high capacity, high efficiency heat exchanger such as the dryer 10 is available. A pound of natural gas, which may be available to a municipality at as little as two to three cents a pound, will melt approximately 80 pounds of ice.

When the drum dryer 10 is used as a snow and ice melter, a drain (not shown) is disposed in the bottom of the discharge trough 62 to drain the water produced from the melted snow and ice out of the heating chamber 12. If the water drain is covered with a grating conforming to the bottom of the discharge trough 62, the discharge sweeps 64 will remove debris and gravel from the drum discharge thereby separating the water from any entrained materials. Additionally, a pump (not shown) may be employed to move water from the fines tray 121 to wet incoming snow.

Infrared sensors 181, shown in FIG. 1C, may be mounted along the drum in the burner section 84 for monitoring the temperature of the drum. The temperature data may be input to a general purpose controller 200 which controls the level and number of burners lit. By adjusting the level of the burners, and the number of burners 88 which are lit in response to the conditions detected by the sensors 181, the material 30 flowing through the drum may be prevented from overheating, and the drum also may be prevented from overheating. The dryer 10, which may have up to seven discrete burners 88 each of which has a turndown ratio of 8, meaning the thermal output of each burner can be adjusted by a ratio of 1 to 8 thus allowing the total heat input to the dyer 10 to be adjusted by a factor of fifty-six. This is an important feature in the dryer's ability to heat varying amounts of material while preventing overheating or scorching of any of the material 30.

It should be understood that the interior quadrant plates 40 and sweeps 38 and flights 50 may be constructed of wear resistant steel plates or angles.

It should further be understood that where steel is to be attached to the aluminum drum section 98, the preferred method of attachment will be through the use of stainless steel bolts and washers penetrating the drum 11, with stainless steel shims isolating the inner steel component from the aluminum drum 98 to avoid galvanic corrosion between the steel and the aluminum. For example, the quadrant plates 40 in the forward one-third 98 of the drum are bolted to angles (not shown) which are isolated from the aluminum drum 98 by stainless steel shims. Further, it may be desirable to extend the 1 angles across the joint 170 thereby reinforcing the joint by the bolted angles.

It should also be understood that where high exhaust gas velocities are found in the heating chamber 12 such as in the horizontal chimneys 122 the ceramic blankets or battens 90 may be stiffened to resist the air currents by coating them with a ceramic hardener.

It should also be understood that spray bars may be mounted in the interior of the preheat section 80 or in the vertical chimneys 125 for washing dust and particulates off the forward section 98 of the drum or to remove particulates as they exit the vertical chimneys 125.

It should be understood that the number and size of the burners 88 may be varied and that the dryer 10 may be made of various sizes to accommodate different drying or heating functions.

It should also be understood that the dryer 10 may be made to operate in a mobile configuration wherein hydraulic jacks and an inclinometer are used to maintain the drum 11 in the proper orientation for the flow of materials through the drum.

It should also be understood that a heat reclaimer for use with power plants and the like could be manufactured using only the heat reclaiming section of the dryer 10 disclosed herein.

It should in addition be understood that the dryer 10 may be made of varying lengths and sizes depending on the application for which it is intended It is understood that the invention is not confined to the particular construction and arrangement of parts herein illustrated and described, but embraces such modified forms thereof which come within the scope of the following claims.

We claim:

1. An apparatus for drying material comprising:
a) cylindrical drum rotatable about a longitudinal axis and having an exterior and portions defining a material inlet at one end of the drum and a material outlet at the opposite end of the drum, wherein the drum has portions defining a cavity therein which permits the passage of material and exhaust gases through the drum in a counterflow relationship;
b) a heating chamber communicating with the material outlet end of the drum and enclosing a substantial portion of the axial length of the drum; and
c) a heat source which directs heated exhaust gases onto the drum exterior within the heating chamber to heat the drum, wherein portions of the heating chamber direct said heated exhaust gases into the material outlet of the drum and wherein said heating chamber gas directing portions are substantially sealed to prohibit the escape of exhaust gases from the chamber at that location, such that substantially all the exhaust gases are directed into the drum material outlet and escape from the apparatus through the drum material inlet, wherein the heat source comprises a plurality of heaters mounted to the heating chamber and spaced axially along the chamber such that the heaters are spaced radially outwardly from the drum and are selectively operable to control the amount of heat supplied to the drum.

2. An apparatus for drying material comprising:
a) a cylindrical drum rotatable about a longitudinal axis and having an exterior and portions defining a material inlet at one end of the drum and a material outlet at the opposite end of the drum, wherein the drum has portions defining a cavity therein which permits the passage of material and exhaust gases through the drum in a counterflow relationship;
b) a heating chamber communicating with the material outlet end of the drum and enclosing a substantial portion of the axial length of the drum; and
c) a heat source which directs heated exhaust gases onto the drum exterior within the heating chamber to heat the drum, wherein portions of the heating chamber direct said heated exhaust gases into the material outlet of the drum and wherein said heating chamber gas directing portions are substantially sealed to prohibit the escape of exhaust gases from the chamber at that location, such that substantially all the exhaust gases are directed into the drum material outlet and escape from the apparatus through the drum material inlet, wherein a multiplicity of metallic fins extend outwardly from the drum exterior and wherein the fins support a band which functions as a heat shield for the drum within the heating chamber.

3. An apparatus for drying material comprising:
a) a cylindrical drum rotatable about a longitudinal axis and having an exterior and portions defining a material inlet at one end of the drum and a material outlet at the opposite end of the drum, wherein the drum has portions defining a cavity therein which permits the passage of material and exhaust gases through the drum in a counterflow relationship;
b) a heating chamber communicating with the material outlet end of the drum and enclosing a substantial portion of the axial length of the drum; and
c) a heat source which directs heated exhaust gases onto the drum exterior within the heating chamber to heat the drum, wherein portions of the heating chamber direct said heated exhaust gases into the material outlet of the drum and wherein said heating chamber gas directing portions are substantially sealed to prohibit the escape of exhaust gases from the chamber at that location, such that substantially all the exhaust gases are directed into the drum material outlet and escape from the apparatus through the drum material inlet wherein a multiplicity of metallic fins extend outwardly from the drum exterior and wherein the fins support a band which functions as a heat shield for the drum within the heating chamber and, wherein the fins are at an acute angle with respect to the axis of the cylinder so as to move the gases within the heating chamber toward the material outlet of the rotating drum.

4. An apparatus for drying sludge and granular material comprising:
   a) a rotatable cylindrical drum, having a cavity therein, the drum having a material inlet and a material outlet in communication with the cavity;
   b) a heating chamber enclosing and substantially surrounding the drum, wherein the drum is rotatably mounted within the heating chamber and the heating chamber has portions defining a material inlet proximate to the drum material inlet, and the chamber has portions defining a material outlet proximate to the outlet of the drum; and wherein the heating chamber material inlet and material outlet have portions which restrict the flow of gases from the heating chamber therethrough;
   c) a baffle extending within the heating chamber transverse to the axis of the drum and dividing the heating chamber into two sections, the first section being disposed near the drum inlet and the second section is disposed near the drum outlet;
   d) a source of hot gases which supplies hot gases to the second section of the heating chamber to direct heat to the drum exterior, and wherein the gases are directed by the second section to enter the drum outlet and to flow towards the drum inlet; and
   e) a hot gases outlet in the first section of the heating chamber through which gases are exhausted from the drum, wherein the flow of hot gases through the heating chamber from the second compartment to the outlet is through the cylindrical drum in counterflow to the material flowing through the drum and wherein the drum is divided into two portions, one portion substantially contained within the second portion of the heating chamber said one portion being composed of stainless steel, the drum having a second drum portion substantially contained in the first heating section wherein the second drum portion is constructed of aluminum.

5. An apparatus for drying sludge and granular material comprising:
   a) a rotatable cylindrical drum, having a cavity therein, the drum having a material inlet and a material outlet in communication with the cavity;
   b) a heating chamber enclosing and substantially surrounding the drum, wherein the drum is rotatably mounted within the heating chamber and the heating chamber has portions defining a material inlet proximate to the drum material inlet, and the chamber has portions defining a material outlet proximate to the outlet of the drum; and wherein the heating chamber material inlet and material outlet have portions which restrict the flow of gases from the heating chamber therethrough;
   c) a baffle extending within the heating chamber transverse to the axis of the drum and dividing the heating chamber into two sections, the first section being disposed near the drum inlet and the second section is disposed near the drum outlet;
   d) a source of hot gases which supplies hot gases to the second section of the heating chamber to direct heat to the drum exterior, and wherein the gases are directed by the second section to enter the drum outlet and to flow towards the drum inlet; and
   e) a hot gases outlet in the first section of the heating chamber through which gases are exhausted from the drum, wherein the flow of hot gases through the heating chamber from the second compartment to the outlet is through the cylindrical drum in counterflow to the material flowing through the drum, and wherein the baffle dividing the heating chamber into two portions is sealed to the drum by a labyrinth seal.

6. A cylindrical drum rotatable about a longitudinal axis for use in an apparatus for effecting heat transfer to a material comprising:
   a) a first cylindrical axially extending portion composed of a first metal having a first coefficient of thermal expansion;
   b) a second cylindrical axially extending portion composed of a second metal having a coefficient of thermal expansion greater than said first coefficient of thermal expansion;
   c) a sleeve which overlies both cylindrical portions and which has an annular portion which is circumferentially fixed to the first portion, and axially extending petals extend from the sleeve annular portion, wherein each petal is fixed at at least one location to the second cylindrical portion, such that when the drum is subjected to an temperature variations, the second cylindrical portion may expand radially with respect to the first cylindrical portion, with the petals being deflected radially.

7. The drum of claim 6 wherein the petals are connected to the second cylindrical portion by bolts, and wherein the sleeve annular portion is welded to the first cylindrical portion.

8. The drum of claim 6 wherein the sleeve is formed of a material having substantially the same coefficient of thermal expansion as the second cylindrical portion of the drum.

9. The drum of claim 6 wherein axial slots are defined between the petals and wherein portions of the sleeve define stress relieving holes at the junction of the slots and the annular portion of the sleeve.

10. An apparatus for effecting heat transfer to a material comprising:
   a) an inclined drum rotatable about a longitudinal axis and having an inwardly facing interior surface;
   b) a plurality of adjacent drum dividing plate sets, wherein each plate set comprises at least three plates which extend along the axis of the drum and radially outwardly from the drum axis and engage the drum interior, and wherein the plate sets are spaced axially from one another, and wherein each set of plates is angularly offset about the axis of the drum from adjacent plate sets by a selected angle, and wherein the plates within a set have axial edges which meet at the drum axis and outer edges which are spaced around the drum interior surface;

c) a plurality of radial plates between adjacent sets of plates which extend perpendicular to the drum axis, the axis of the drum passing through the radial plates, the radial plates forming pockets with the plates of each plate set which receive material passing through the drum thus impeding the material in the drum from moving up the incline of the drum;

d) a heat source communicating with the drum which supplies heated gases which pass through the drum to heat material contained therein.

11. The apparatus of claim 10 further comprising;

a) at least one temperature detecting sensor located to detect the temperature of the drum; and b) a controller which receives information from the sensor and which is connected in controlling relation to the heat source to control the temperature of the drum and thus the material being heated.

12. The apparatus of claim 10 wherein the sets of plates contain four plates fixed to the circumference of the drum at 90 degree intervals and wherein adjacent sets of plates are offset by 30 degrees about the axis of the drum.

13. The apparatus of claim 10 wherein the sets of plates comprise flat planar plates fixed to the circumference of the drum.

14. An apparatus for effecting heat transfer to a material comprising:

a) an enclosed heating chamber;

b) a drum rotatable about a longitudinal axis mounted within the heating chamber and having an exterior and an interior cavity, the drum having a forward tire and a rear tire which are engaged with and driven by forward trunions and rear trunions respectively;

c) a source of hot exhaust gasses communicating with the heating chamber and heating the exterior of the drum;

d) insulative barriers within the heating chamber defining a rear trunion gap, the barriers isolating the rear tire and rear trunions from the hot exhaust gases;

e) at least one horizontal duct which conducts hot exhaust gases across the rear trunion gap, such that portions of the drum disposed ahead of and after the rear trunion gap may be exposed to the heated gases.

15. The apparatus of claim 14 further comprising a central baffle dividing the heating chamber into a preheat section and a heating section, and wherein the rear tire together with the rear trunions are located in the heating section, and wherein the drum has a first end with portions defining a material inlet located in the preheat section, and a second end with portions defining a material outlet located in the heating section and wherein hot exhaust gasses are communicated to the material outlet from the heating section through the trunion gap by the horizontal duct and enter the material outlet and exit the material inlet thus exchanging heat in a counterflowing relation with material moving through the drum from the material inlet to the material outlet.

16. The apparatus of claim 14 further comprising a vertical chimney which extends from the heating chamber which vents the preheat section, said chimney being located adjacent to the central baffle.

17. The apparatus of claim 14 wherein the preheat section has a bottom underlying the drum with portions forming a tray for the collection of water and wherein the vertical chimney extends beneath the axis of the drum and is spaced a selected distance from the tray.

18. The apparatus of claim 4, wherein the hot gases outlet in the first section of the heating chamber, through which gases are exhausted from the drum, is comprised of at least one stack which has an opening spaced from and adjacent to the bottom of the preheat section and is located adjacent to the baffle separating the preheat chamber from the heating chamber.

* * * * *